(12) United States Patent
Venishetti et al.

(10) Patent No.: US 9,588,559 B2
(45) Date of Patent: Mar. 7, 2017

(54) CONFIGURABLE POWER SUPPLIES FOR DYNAMIC CURRENT SHARING

(71) Applicant: Intel Corporation, Santa Clara, CA (US)

(72) Inventors: Sandeep K. Venishetti, Folsom, CA (US); Sanjeev S. Jahagirdar, Folsom, CA (US); Srinivas Thota, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 260 days.

(21) Appl. No.: 14/138,550

(22) Filed: Dec. 23, 2013

(65) Prior Publication Data
US 2015/0177798 A1 Jun. 25, 2015

(51) Int. Cl.
*G06F 1/32* (2006.01)
*G06F 1/26* (2006.01)
*G06F 1/18* (2006.01)
*H02J 3/00* (2006.01)

(52) U.S. Cl.
CPC ............... *G06F 1/26* (2013.01); *G06F 1/189* (2013.01); *G06F 1/263* (2013.01); *G06F 1/3287* (2013.01); *H02J 2003/001* (2013.01); *Y02B 60/1282* (2013.01); *Y10T 307/352* (2015.04)

(58) Field of Classification Search
None
See application file for complete search history.

(56) References Cited

U.S. PATENT DOCUMENTS

| | | | |
|---|---|---|---|
| 7,519,843 B1 * | 4/2009 | Buterbaugh | G06F 1/30 713/322 |
| 2004/0215987 A1 | 10/2004 | Farkas et al. | |
| 2006/0082351 A1 * | 4/2006 | Martins | H02J 9/005 323/268 |
| 2008/0172565 A1 | 7/2008 | Chu et al. | |
| 2012/0079290 A1 | 3/2012 | Kumar et al. | |
| 2013/0033106 A1 * | 2/2013 | Schindler | H02J 7/0065 307/38 |
| 2013/0193755 A1 | 8/2013 | Chang et al. | |

OTHER PUBLICATIONS

European Patent Office, Extended European Search Report mailed May 6, 2015, in European Patent Application No. 14192389.6.

(Continued)

*Primary Examiner* — Paul Yanchus, III
(74) *Attorney, Agent, or Firm* — Trop, Pruner & Hu, P.C.

(57) ABSTRACT

An apparatus includes a distribution network that includes circuitry configured to receive first power from a first voltage source and second power from a second voltage source, and to deliver power to each of a plurality of electronic circuitry blocks (ECBs), including to deliver first ECB power to a first ECB and second ECB power to a second ECB. The first ECB power includes a first portion of the first power and a first portion of the second power. The apparatus also includes power management logic to dynamically adjust the power to be provided to each ECB. Responsive to a change in a first activity level of the first ECB, the power management logic is to change the first ECB power by adjustment of the first portion of the first power and adjustment of the first portion of the second power. Other embodiments are described and claimed.

19 Claims, 7 Drawing Sheets

(56) References Cited

OTHER PUBLICATIONS

Lackey D. E., et al. : "Managing Power and Performance for System-On-Chip Designs Using Voltage Islands", IEEE/ACM International Conference on Computer Aided Design. ICCAD 2002. IEEE/ACM Digest of Technical Papers. San Jose, CA, Nov. 10-14, 2002; {IEEE/ACM International Conference on Computer-Aided Design}, New York, NY: IEEE, US, Nov. 10, 2002, pp. 195-202, XP010624646, ISBN: 978-07803-7607-6.

"QDSP6 V4: Qualcomm Gives Customers and Developers Programming Access to its DSP Core", BDTi, http://www.bdti.com/InsideDSP/2012/06/21/Qualcomm.

European Patent Office, Examination Report mailed May 12, 2016 in European Patent Application No. 14192389.6.

\* cited by examiner

CONFIGURABLE POWER SUPPLIES FOR DYNAMIC CURRENT SHARING

TECHNICAL FIELD

Embodiments pertain to dynamic power distribution.

BACKGROUND

An electronic system that includes multiple sub-systems (electronic circuitry blocks (ECBs) herein) may have varying power requirements that differ for each sub-system. Each ECB may include one or more of a processor core or portion thereof, graphics processing unit, system unit agent, memory controller unit, display engine unit, cache controller unit, memory bank such as static random access memory (SRAM) block, audio engine, modem unit, wireless connectivity unit (e.g., wifi), controller (e.g., debug controller, peripheral component interconnect express (PCie) controller, local area network (LAN) controller, universal serial bus (USB) controller, serial advanced technology attachment (SATA) controller), etc.), on-chip connectivity fabric, etc. Typically, each ECB receives power via a distinct source such as a voltage regulator (VR). Each source may have a current rating that is typically chosen to be a worst case current value for the sub-system that it supplies, e.g., a highest current value that the corresponding sub-system may consume in a highest power usage scenario.

However, only very rarely does an ECB reach its worst case power scenario. Further, not all ECBs reach worst case concurrently. Hence, specification that each VR have a worst case current rating to supply power to its respective ECB may result in overcapacity for a large portion of run time of the system, which can be both costly and wasteful of resource capability and can result in reduction in system performance.

DETAILED DESCRIPTION

Power supplied by a plurality of sources (e.g., voltage regulators (VRs)) and distributed to each of a plurality of ECBs (e.g., processors, graphical processor units, memory, controllers, etc.) through a distribution network may be dynamically managed as power needs of one or more of the ECBs change with time. Each of the ECBs may receive its power from two or more of the plurality of sources so that each source supplies a respective portion of its output power to each of the plurality of ECBs, and allocation of the output power among the ECBs may be adjusted as the power needs of the ECBs change over time, e.g., dynamically.

Each of the ECBs may supply updated activity level information to a power management unit (PMU), according to embodiments of the present invention. In an embodiment, updated activity level information is supplied on a periodic basis. In another embodiment, the updated activity level information may be supplied when a change in activity level is detected that matches or exceeds a threshold, e.g., an activity change threshold is reached. The PMU may evaluate activity levels of each PMU and may dynamically manage power (which may include, e.g., management of peak current) to be supplied to each of the plurality of ECBs based on the activity level information received from the ECBs.

The power to a particular ECB may be supplied by two or more of the VRs, and a power distribution scheme, e.g., the portion of power supplied by each VR to each ECB, may be changed by the PMU in response to changes in power needs of one or more of the ECBs (e.g., by adjustment of respective current supplied by each of various VRs to a particular ECB), according to embodiments of the present invention.

Figure 1:
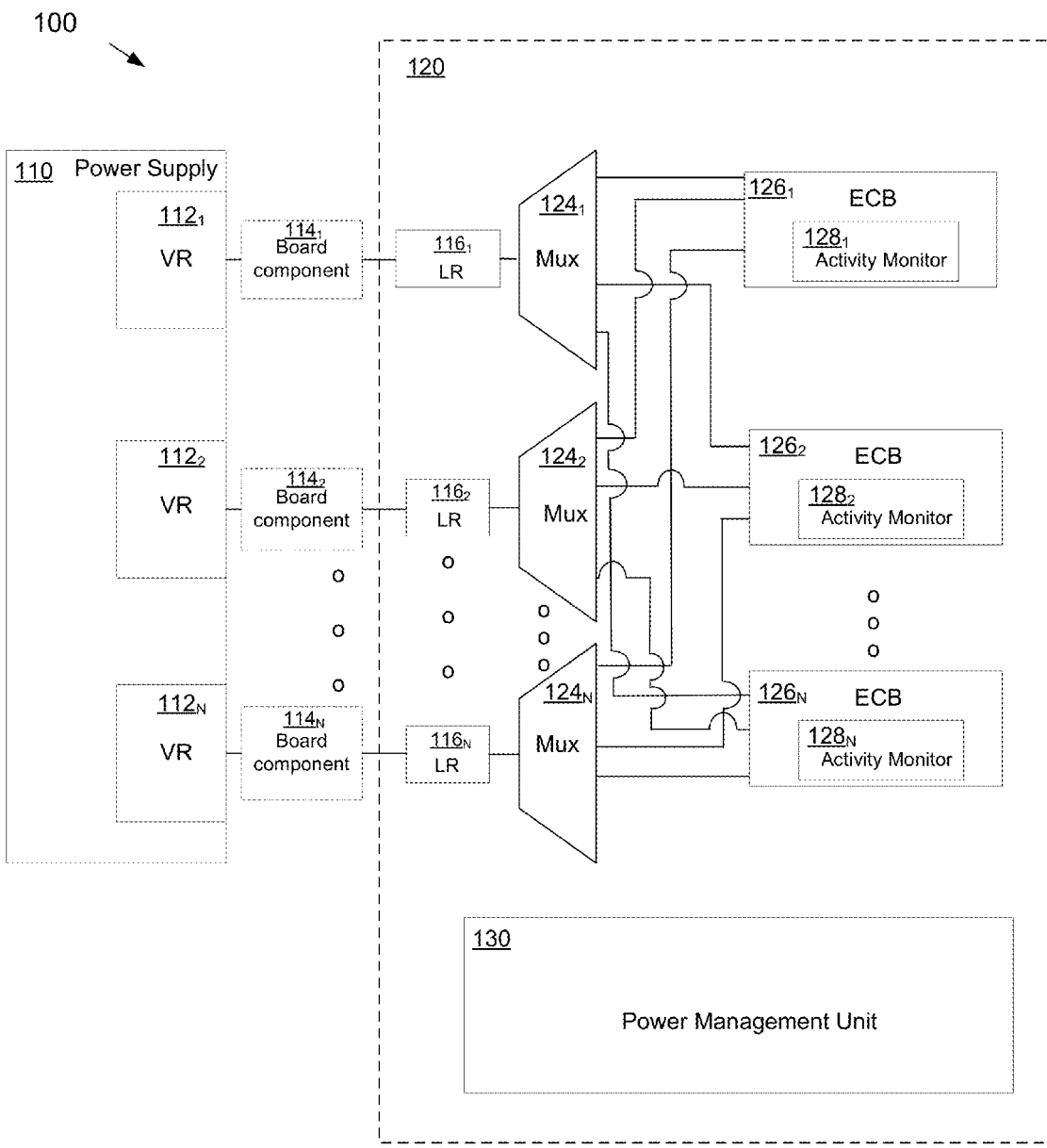
FIG. 1 is a block diagram of a system to distribute power among ECBs, according to an embodiment of the present invention.

FIG. 1 is a block diagram of a system 100 to provide power to a plurality of ECBs, according to an embodiment of the present invention. The system 100 includes a power supply 110 and circuitry 120. The power supply 110 may include a plurality of voltage regulators (VRs) $112_1$, $112_2$, ..., $112_N$. The circuitry 120 includes a plurality of ECBs $126_1$, $126_2$, ..., $126_N$, a plurality of multiplexers ("muxes" herein, e.g., power muxes) $124_1$, $124_2$, ..., $124_N$, optionally one or more linear regulators (LRs) $116_1$, $116_2$, ..., $116_N$, and a power management unit (PMU) 130. In an embodiment, the circuitry 120 is included in a system on a chip (SOC).

In operation, each of the VRs $112_1$, $112_2$, ..., $112_N$ of the power supply 110 may supply a corresponding portion of power (power contribution) to be distributed to the ECBs $126_1$, $126_2$, ..., $126_N$. The corresponding power contribution from each VR may optionally pass through an intervening board component $114_1$, $114_2$, ..., $114_N$, e.g., capacitor, resistor, transistor, etc. If present, linear regulators $116_1$, $116_2$, ..., $116_N$ may adjust voltage to be provided to the ECBs $126_1$, $126_2$, ..., $126_N$. via the muxes $124_1$, $124_2$, ..., $124_N$.

Each ECB $126_1$-$126_N$ may have a respective power requirement on startup of system 100. The PMU 130 may determine, for each ECB, a corresponding combination of power contributions to be supplied by the VRs $112_1$-$112_N$. The power requirement of a particular ECB $126_1$ may reflect the activity level of the ECB $126_1$ that may be determined by factors such as workload, complexity of instructions, data size, and other factors. The PMU 130 may control the muxes $124_1$-$124_N$ to route power to each ECB $126_1$-$126_N$. For example, ECB $126_1$ may have a first power requirement (e.g., at a fixed voltage determined by frequency of operation of the ECB) that may be supplied by a combined current of a first current from mux $124_1$, a second current from mux $124_2$, and a third current from mux $124_3$. The PMU 130 may control each of the muxes $124_1$-$124_N$ to provide the corresponding portions (e.g., currents) of the first power requirement to ECB $126_1$ at a determined operating voltage of ECB $126_1$. In similar fashion, the PMU 130 may control a second power to ECB $126_2$ that is supplied by output current portions from the muxes $124_1$-$124_N$. Each mux $124_1$-$124_N$ may have a corresponding input power provided by, e.g., a corresponding LR $116_1$-$116_N$ that may output a determined voltage to be used by a particular subset of ECBs, and each LR may receive input power from a respective VR $112_1$-$112_N$. In embodiments that include LRs, each LR $116_1$-$116_N$ may be controlled by the PMU 130 to provide the respective input voltage (e.g., determined by the PMU) to its respective mux. In other embodiments, each mux $124_i$ may receive power directly from a corresponding VR $112_i$ without an intervening LR $116_i$ and each VR $112_i$ may be operated at a corresponding determined voltage to supply the voltage at which the corresponding ECBs served by the VR operate.

Each ECB $126_1$-$126_N$ may have a corresponding activity monitor $128_1$-$128_N$ to determine a present activity level and/or future activity level of its ECB. Each activity monitor $128_1$-$128_N$ may provide activity information to the PMU 130, and the PMU 130 may determine the power distribution to the ECBs based on the received activity information. The PMU 130 may dynamically adjust a current distribution from the muxes $124_1$-$124_N$ to the ECBs $126_1$-$126_N$ (e.g., through adjustment of LRs 116 and/or adjustment of output of the muxes $124_1$-$124_N$) in response to changes in power requirements, based on the respective activity level received from each ECB.

For example, in one embodiment, the PMU 130 may update the power distribution periodically, e.g., with a period determined via timers in the activity monitors. In one example, the period of the timer may be approximately 20 microseconds. In other embodiments, the timer period may be longer or shorter than 20 microseconds. In an example, if the activity level of a first ECB is reduced during a first period, in duration the PMU 130 may reduce the power provided to the first ECB by reallocating current so that a reduced current is provided to the first ECB and additional current (e.g., not needed by the first ECB) is allocated to one or more other ECBs that can utilize the additional current to execute its workload.

In another embodiment, the PMU 130 may adjust the power distribution in response to a detected change in activity level of one or more of the ECBs. For example, a change in an activity level of one of the ECBs may be compared with an activity change threshold, which may be configurable, and if the threshold is reached, the PMU 130 may update the power distribution to the ECBs by, e.g., changing an output current distribution of the muxes $124_1$-$124_N$ to the ECBs $126_1$-$126_N$ and/or adjustment of power input to each of the muxes. Each VR may also be adjusted via the PMU 130 for output voltage responsive to a change in operating frequency of one of the ECBs so as to provide at least a minimum voltage to operate each supplied ECB at its intended frequency of operation. In an embodiment, the frequency of operation of a particular ECB determines the minimum voltage at which to operate the ECB, and all ECBs to receive power via a particular subset of muxes will receive the same voltage, e.g., the voltage that enables operation of all of the ECBs supplied by the subset of muxes. The corresponding current supplied to each ECB may be controlled by the PMU 130 through adjustment of the muxes.

If requested power by a particular ECB (e.g., determined via the activity monitors) exceeds a power license, e.g., power level granted to the ECB by the power supply 110 at an earlier time, the PMU may indicate to the ECB that execution of instructions is to be throttled, e.g., intentionally slowed, in order to reduce power consumption until a new power license is approved by the power supply 110. The activity levels of each ECB may continue to be monitored while the particular ECB is throttled.

Dynamic reallocation of current based on power needs of the ECBs can allow each ECB to execute its workload and can reduce a tendency toward overcapacity of the power supply that might otherwise occur if each ECB were to be supplied power by only one VR. In a fixed total power system, dynamic reallocation can also result in higher system performance than fixed availability of power to each ECB.

Figure 2:
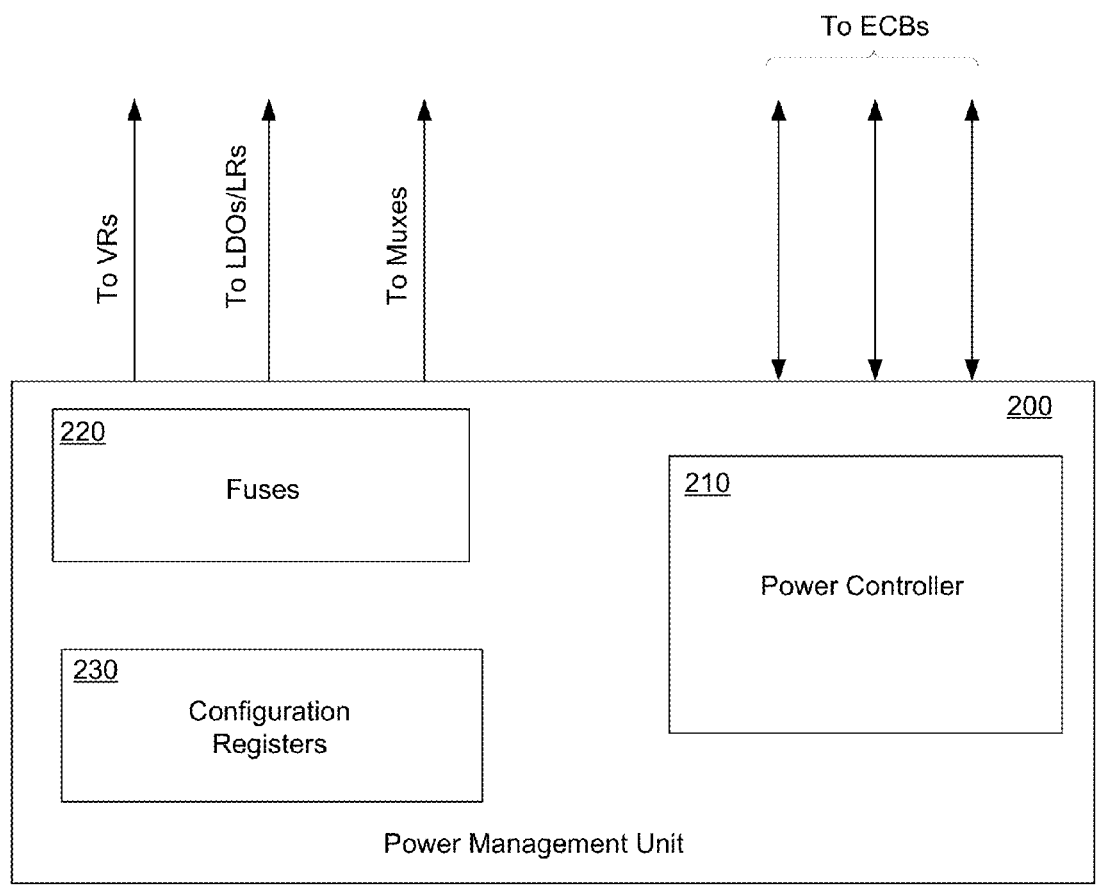
FIG. 2 is a block diagram of a power management unit (PMU), according to an embodiment of the present invention.

FIG. 2 is a block diagram of a power management unit (PMU) 200, according to embodiments of the present invention. The PMU 200 includes a power controller 210, a fuse bank 220, and configuration parameter storage 230.

In operation, the power controller 210 receives information from the fuse bank 220 that may include a frequency-voltage relationship for each ECB of a system such as the system 100 of FIG. 1. The power controller 210 may configure each LR and each mux of the system, according to initial configuration parameters that may be stored in the configuration parameter storage 230, and/or based on initial voltages at a standard frequency of operation for each ECB, e.g., 1 GHz or another standard frequency of operation In some embodiments, the configuration parameter storage 230 may also store information such as peak frequency per ECB, peak current per ECB, capacitance per ECB, etc. and may also store voltage regulator parameters such as ramp time, current capability, temperature information, etc., and other parameters that may indicate LDO status, mux status, etc.

The power controller 210 may receive activity level information from one or more ECBs for which the power controller 210 controls supplied power. The power controller 210 may determine updated configuration parameters for each of a plurality of ECBs, muxes, and (optionally) LRs, based on the activity level information received. The updated configuration parameters may be stored in the configuration parameter storage 230 and may result in updated operation parameters being sent to the muxes and/or LRs. The configuration parameters may correspond to voltage and current to be supplied by each mux to two or more ECBs, e.g., from power sources (e.g., VRs). That is, any particular mux may supply power to each of a plurality of ECBs by apportionment of input power received by the mux. The power controller 210 may reallocate a power distribution to the ECBs, e.g., periodically, or at each instance in which a detected change in activity level exceeds an activity change threshold. In some embodiments, the power licenses issued to an ECB may be updated periodically that can result in a change of power supplied to the ECB.

The configuration registers 230 may store power license levels for each of the one or more ECBs, which may be updated in response to a change in the activity level of the corresponding ECB. The power license of an ECB can provide an indication of peak power to be provided to the ECB. In some embodiments, an increase in the power license of a first ECB may be compensated by a reduction in the power license of a second ECB responsive to a reduced activity level of the second ECB. By adjusting several power licenses, total available power may be reallocated so as to provide higher power to some ECBs with increased demand as a result of increased activity level, and to provide lower power to other ECBs with reduced demand due to a reduced activity level.

Dynamic allocation of the power that is provided by a plurality of power sources may result in increased efficiency in overall power usage through avoidance of throttling. For example, if a first ECB experiences a reduction in workload, some of the power that had been allocated to the first ECB may be reallocated, e.g., by redistribution of current output of one or more muxes to one or more other ECBs that have a higher power requirement in order to execute their respective workloads without throttling. The reallocation may be determined at least in part based on respective activity levels received by the power controller from the ECBs. Dynamic reallocation of power may permit a reduction in power supply overcapacity, since each source (e.g., VR) does not need to be sized to handle a maximum power need (e.g., power virus) of one ECB. Rather, a combination of VRs can provide power that may be reallocated to each of several ECBs on an as-needed basis. Dynamic allocation of power may also result in a higher system performance, e.g., for a fixed power supply capacity.

Figure 3:
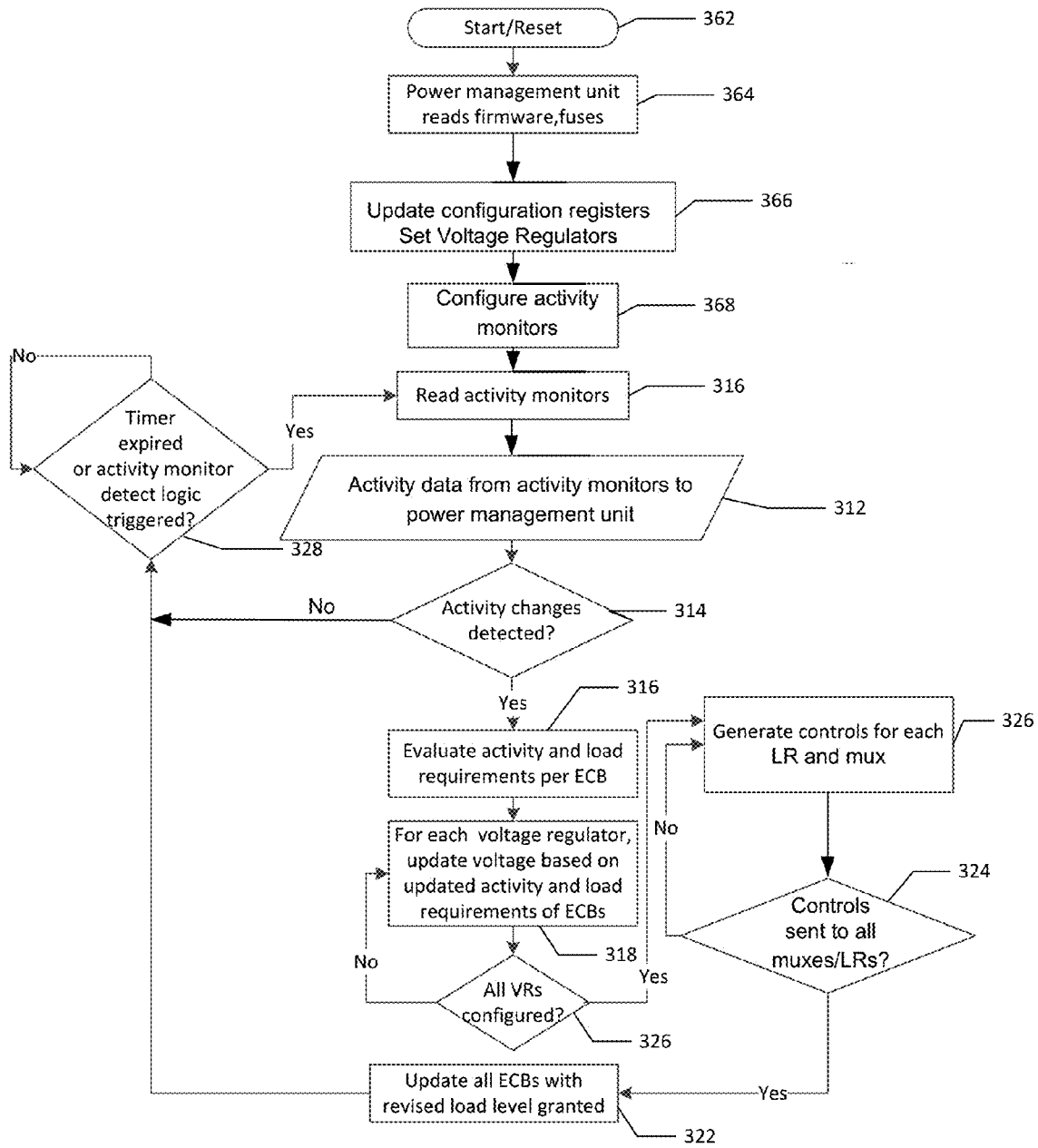
FIG. 3 is a flow diagram of a method of distributing power among ECBs, according to an embodiment of the present invention.

FIG. 3 is a flow diagram of a method of providing power to a plurality of ECBs, according to an embodiment of the present invention. The method begins at block 302. Continuing to block 304, a power controller within a power management unit (PMU) reads firmware to be executed, and also reads information stored in a fuse bank, e.g., to determine initial operating parameters for each ECB. Advancing to block 306, configuration registers within a configuration parameter storage are updated and voltage regulators are set by the power controller, e.g., based on initial workload information provided by the ECBs, fuse information, etc. Moving to block 308, activity monitors within each ECB are configured.

Proceeding to block 310, activity data from each activity monitor is read by the corresponding ECB. Continuing to block 312, the PMU receives the activity data from each ECB. Advancing to decision diamond 314, if activity changes are detected, e.g., through comparison to previously received activity information, issued power licenses, etc., the method proceeds to block 316. If no activity changes are detected, proceeding to decision diamond 328, if an activity check timer is expired or activity monitor detect logic is triggered, returning to block 310 the activity monitors are read again and the (updated) activity data is sent to the PMU at block 312. If the activity check timer is not expired (or activity monitor detect logic is not triggered), the method waits at decision diamond 328 until activity monitors are to be re-read.

Back at decision diamond 314, if activity changes have been detected, proceeding to block 316 the PMU is to evaluate activity and load requirements per ECB to determine power levels at which to operate each ECB. Continuing to block 318, each VR may be updated with regard to voltage output, based on the updated activity and load requirements of the ECBs. Advancing to decision diamond 320, if all VRs are configured according to updated activity information received from the ECBs, moving to block 326, controls (e.g., configuration parameter values) may be generated for each LR and each power mux to provide an appropriate level of current (e.g., at a determined ECB operating voltage) to each ECB. The current provided to a particular ECB is a sum of current contributions provided by the power sources via the power muxes.

Moving to decision diamond 324, if all controls have been sent to all muxes and LRs, proceeding to block 322, each ECB is updated with a revised power license that is granted, which serves as permission for the ECB to operate at a revised power level that may be higher or lower than a previous power level and that may be determined based upon a corresponding workload to be executed. Current provided to each ECB may be reallocated (e.g., redistributed) in order to satisfy current requirements of the revised load levels of the ECBs, per the revised power license(s).

Figure 4:
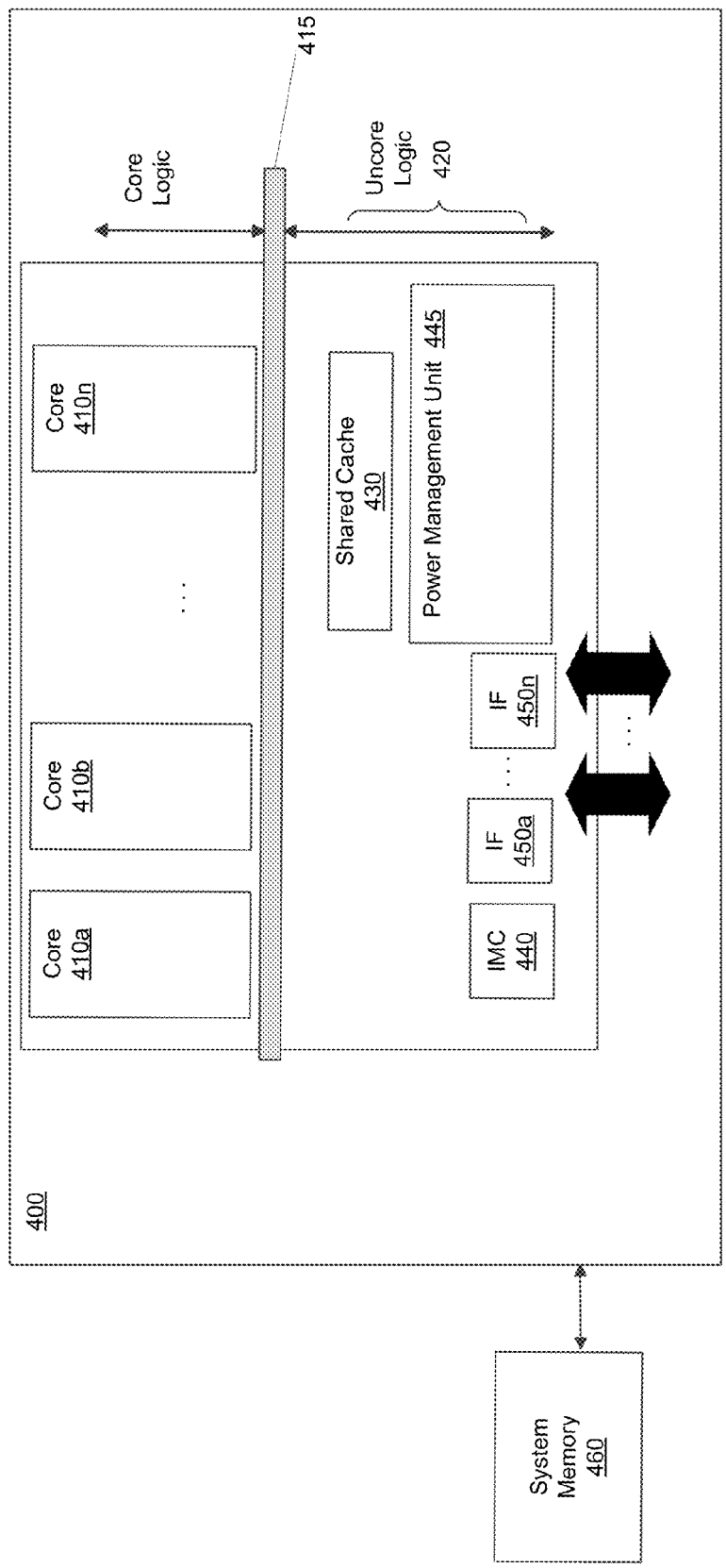
FIG. 4 is a block diagram of a processor, in accordance with an embodiment of the present invention.

Referring now to FIG. 4, shown is a block diagram of a processor, in accordance with an embodiment of the present invention. As shown in FIG. 4, processor 400 may be a multicore processor including a plurality of cores $410_a$-$410_n$. The various cores may be coupled via an interconnect 415 to a system agent or uncore 420 that may include various components. As seen, the uncore 420 may include a shared cache 430, which may be a last level cache. In addition, the uncore 420 may include an integrated memory controller 440, various interfaces $450_a$-$450_n$, and a power management unit (PMU) 445. With further reference to FIG. 4, processor 400 may communicate with a system memory 460, e.g., via a memory bus. In addition, by interfaces 450, connection can be made to various off-chip components such as peripheral devices, mass storage and so forth.

The PMU 445 may dynamically manage current distribution to each of the cores $410_i$ according to embodiments of the present invention. For example, the PMU 445 may direct a first mux (not shown) to distribute portions of a first current received from a first VR to a plurality of cores, and the PMU 445 may direct a second mux (not shown) to distribute portions of a second current received from a second VR to the plurality of cores. The PMU 445 may receive activity updates from each of the cores $410_a$-$410_n$, (e.g., from a corresponding activity monitor in each core) and may dynamically redistribute the power (e.g., in some embodiments, redistribute current at a fixed voltage) as activity levels of one or more of the cores changes, according to embodiments of the present invention. While shown with this particular implementation in the embodiment of FIG. 4, the scope of the present invention is not limited in this regard.

Figure 5:
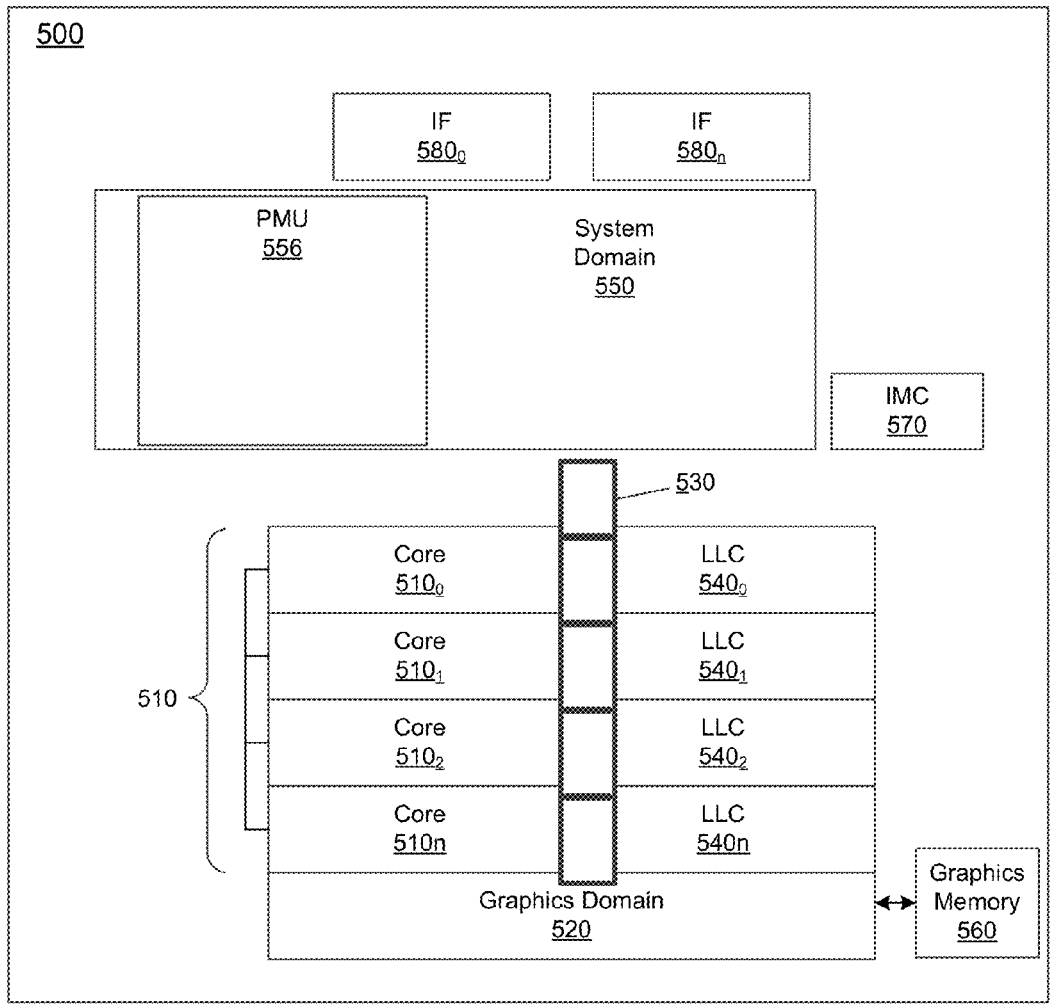
FIG. 5 is a block diagram of a multi-domain processor in accordance with an embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines (e.g., GPU), and a system agent domain 550 may further be present. Note that additional domains can be present in other embodiments. For example, multiple core domains may be present, each including at least one core.

In general, each core $510_i$ may further include low level caches in addition to various execution units and additional processing elements. The various cores may be coupled to each other and to a shared cache memory formed of a plurality of units of a lower level cache (LLC) $540_0$-$540_n$. As seen, a ring interconnect 530 couples the cores together, and provides interconnection between the cores 510, graphics processing unit (GPU) 520, and system agent circuitry 550. The graphics domain 520 may be coupled with a graphics memory 560. As further seen, system agent domain 550 may include a power management unit (PMU) 556 to perform power management operations for the processor. The PMU 556 may dynamically manage power distribution to each of the cores $510_i$ and to other ECBs, e.g., graphics processing units, according to embodiments of the present invention. For example, the PMU 556 may direct a first mux (not shown) to distribute portions of a first current received from a first VR to a plurality of cores, the PMU 556 may direct a second mux (not shown) to distribute portions of a second current received from a second VR to the plurality of cores. The PMU 556 may receive activity updates from each of the cores (e.g., from a corresponding activity monitor in each core) and may dynamically redistribute the current (and in some embodiments may adjust voltages) supplied to the cores as activity levels of one or more of the cores changes, according to embodiments of the present invention.

Processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more peripheral component interconnect express (PCI Express™ (PCIe™)) interfaces. Still further, to provide for communications between other agents such as additional processors or other circuitry, one or more interfaces in accordance with the QPI™ protocol may also be provided. Although shown at this high level in the embodiment of FIG. 5, understand the scope of the present invention is not limited in this regard.

Figure 6:
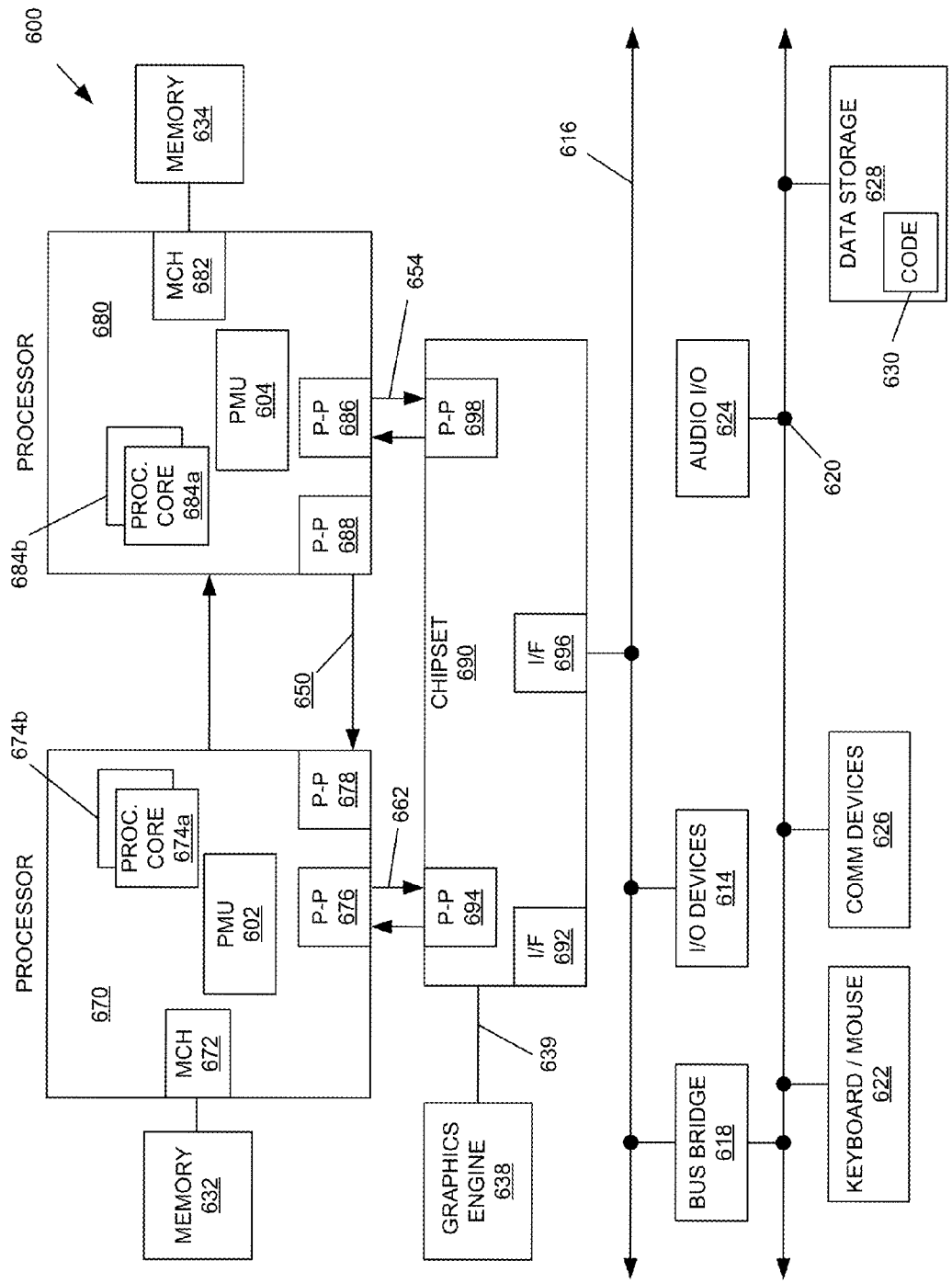
FIG. 6 is a block diagram of another system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. (In other embodiments not shown, the processors may be connected via star topology, mesh topology, cross-bar topology, or by another connection scheme). As shown in FIG. 6, each of processors 670 and 680 may be multicore processors, including first and second processor cores (e.g., processor cores 674a and 674b, and processor cores 684a and 684b), although potentially many more cores may be present in the processors.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories, namely a memory 632 and a memory 634, which may be portions of system memory (e.g., DRAM) locally attached to respective processors. First processor 670 and second processor 680 may be coupled to a chipset 690 via P-P interconnects 662 and 654, respectively. As shown in FIG. 6, chipset 690 includes P-P interfaces 694 and 698. Furthermore, chipset 690 includes an interface 692 to couple chipset 690 with a graphics engine 638 (e.g., GPU) by a P-P interconnect 639.

Each of first processor 670 and second processor 680 may include a power management unit (PMU) 602 and 604 respectively, to perform power management operations for the respective processor. For example, the PMU 602 may dynamically manage power distribution to each of the cores 674a and 674b and to other ECBs of the processor 670 such as additional cores, according to embodiments of the present invention. For example, the PMU 602 may direct a first mux (not shown) to distribute portions of first current received from a first VR to a plurality of the cores including cores 674a and 674b, the PMU 602 may direct a second mux (not shown) to distribute portions of second current received from a second VR to the plurality of cores. The PMU 602 may receive activity updates from each of the cores (e.g., from a corresponding activity monitor in each core) and may dynamically redistribute the current as activity levels of one or more of the cores changes, according to embodiments of the present invention.

Chipset 690 may be coupled to a first bus 616 via an interface 696. As shown in FIG. 6, various input/output (I/O) devices 614 may be coupled to the first bus 616, along with a bus bridge 618, which couples first bus 616 to a second bus 620. Various devices may be coupled to the second bus 620 including, for example, a keyboard/mouse 622, communication devices 626, and a data storage unit 628 such as a disk drive or other mass storage device that may store code 630, in one embodiment. Further, an audio I/O 624 may be coupled to second bus 620. Embodiments can be incorporated into other types of systems including mobile devices such as a smart cellular telephone, tablet computer, netbook, Ultrabook™, notebook, desktop computer, or so forth.

Figure 7:
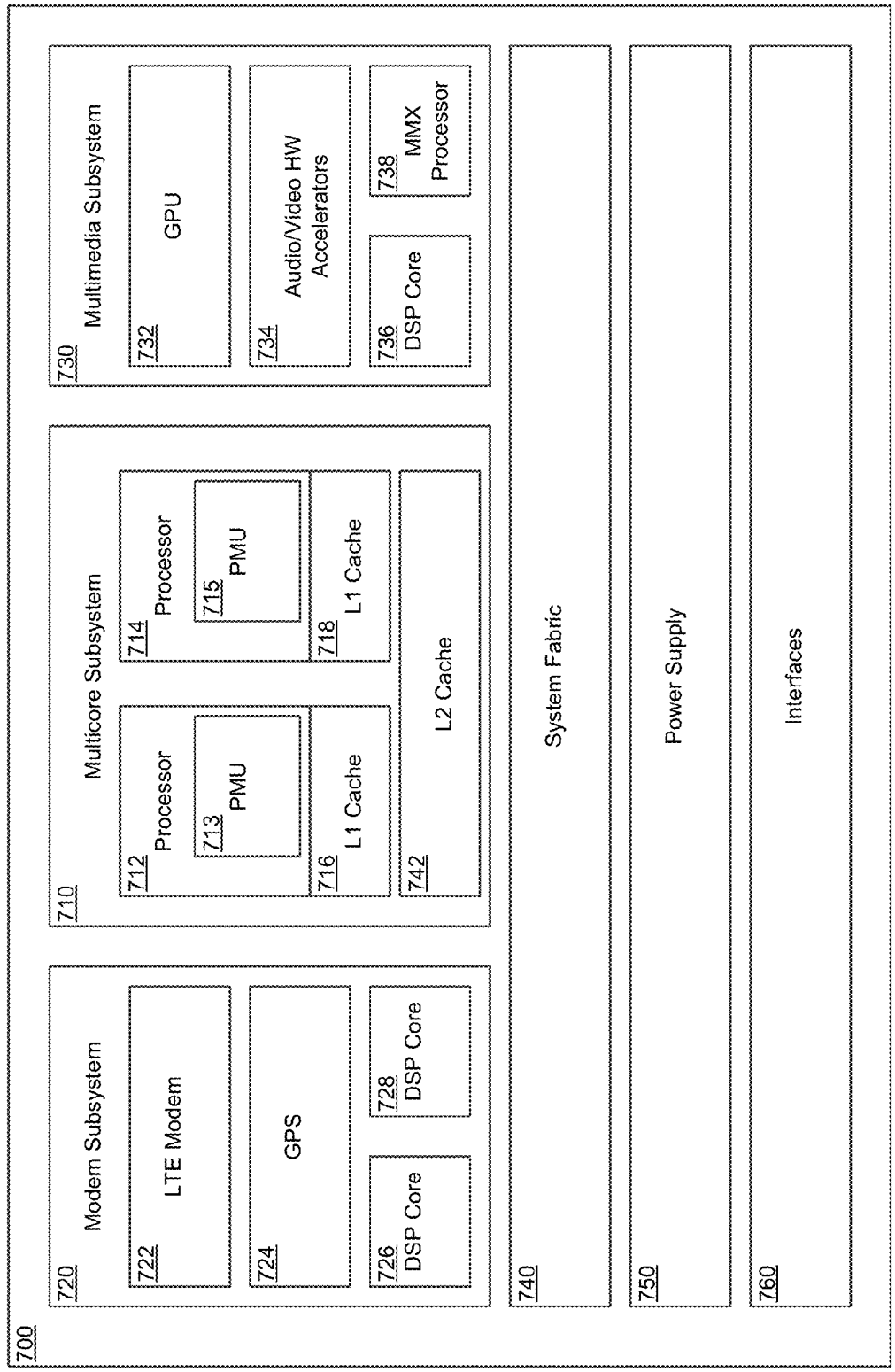
FIG. 7 is a block diagram of a system on a chip, in accordance with embodiments of the present invention.

FIG. 7 is a block diagram of a system on a chip (SOC) in accordance with embodiments of the present invention. The SOC 700 includes a multicore subsystem 710, a modem subsystem 720, a multimedia subsystem 730, system fabric 740, a power supply 750, and interfaces 760 to interface with one or more external devices. The SOC 700 may perform multiple tasks concurrently, e.g., modem tasks, multimedia tasks, and other processing tasks.

The multicore subsystem 710 includes multicore processors 712 and 714, L1 caches 716 and 718, and L2 cache 742. Each of the multicore processors 712 and 714 may include a corresponding PMU 713 and 715 to perform power management operations for the corresponding processor. (In other embodiments not shown, the SOC may have one central PMU for all processors, GPUs, etc.) Each PMU 713, 715 may dynamically manage power distribution to ECBs within its respective processor 712, 714, according to embodiments of the present invention. For example, the PMU 713 may direct a first mux (not shown, e.g., within the system fabric 740) to distribute portions of first current received from a first VR (e.g., located within the power supply 750) to a plurality of cores within the processor 712, and the PMU 713 may direct a second mux (not shown) to distribute portions of second current received from a second VR to the plurality of cores within the processor 712. The PMU 713 may receive activity updates from each of the cores (e.g., from a corresponding activity monitor in each core) and may dynamically redistribute current provided from the muxes as activity levels of one or more of the cores changes, according to embodiments of the present invention.

The modem subsystem 720 may include a Long Term Evolution (LTE) modem 722 for wireless communication of high speed data. The modem subsystem 720 may also include a global positioning system (GPS) 724, and at least two digital signal processor (DSP) cores 726 and 728.

The multimedia subsystem 730 may include a graphics processing unit (GPU) 732, audio/video hardware accelerators 734, a digital signal processing core 736, and an MMX processor 738, which may be capable of processing, e.g., single instruction, multiple data (SIMD) instructions.

The following examples pertain to further embodiments.

In a first example, an apparatus includes a distribution network that includes circuitry configured to receive first power from a first source and second power from a second source. The distribution network is to provide to a first electronic circuitry block (ECB), first ECB power, and also to provide second ECB power to a second ECB. The first ECB power includes a first portion of the first power and a first portion of the second power and the second ECB power includes a second portion of the first power and a second portion of the second power. The apparatus also includes power management logic configured to adjust the first ECB power responsive to a change in a first activity level associated with the first ECB. The power management logic is to dynamically change the first ECB power by adjustment of the first portion of the first power and adjustment of the first portion of the second power.

In a second example that incorporates the features of the first example, the distribution network includes a first multiplexer to receive the first power from the first source and to provide the first portion of the first power to the first ECB and the second portion of the first power to the second ECB. Optionally, the distribution network further includes a second multiplexer that is configured to receive the second power from the second source and to provide a first portion of the second power to the first ECB and a second portion of the second power to the second ECB.

In a third example that includes the features of the first example and that optionally includes the features of the second example, when the first portion of the first ECB power is reduced the distribution network is to provide additional power to another ECB responsive to a request from the other ECB to increase supplied power to the other ECB. Optionally, the change in the first ECB power is accomplished by a change in first current provided to the first ECB while a first voltage to the first ECB is maintained at a substantially constant value.

In a fourth example that includes the features of the first example, the power management logic includes storage to store corresponding configuration parameters for each ECB. The configuration parameters may be associated with operating parameters of the corresponding ECB, such as operating frequency of the corresponding ECB. Optionally, each of the first source and the second source includes a corresponding voltage regulator to provide a corresponding voltage that has a substantially constant value during each time period in which the first activity level and a second activity level associated with the second ECB are unchanged.

In a fifth example that includes the features of the first example, the power management logic includes power control logic to receive an indicator of the first activity level from the first ECB, and to determine the first ECB power based at least in part on the first ECB activity level. Optionally, the power management logic includes power control logic to determine a first voltage to be provided to the first ECB based at least in part on an initial frequency of operation of the first ECB. In an embodiment the power management logic is to periodically poll the first ECB to determine whether the first activity level has changed. In a particular embodiment, the first activity level is polled at a period that is less than or equal to approximately 20 microseconds. Optionally, the first ECB includes at least one of a processor core, a graphics processing unit, a memory, a memory bank, and a controller.

In a sixth example, a machine-readable medium has stored thereon instructions, which if performed by a machine cause the machine to perform a method including distributing first power received from a first source to each of a plurality of electronic circuitry blocks (ECBs) of a system on a chip (SOC), and distributing second power received from a second source to each of the plurality of ECBs. The method also includes redistributing the first power and the second power among the plurality of ECBs responsive to a change in a first activity level associated with a first ECB of the plurality of ECBs. Optionally, there are additional instructions stored on the machine-readable medium that cause the machine to initiate a change of a magnitude of output voltage of one or more of the sources, responsive to the change in the first activity level exceeding an activity level threshold. Redistribution of the power may include a change in magnitude of respective currents provided to two or more of the ECBs, where a first portion of each respective current is provided by the first source and a second portion of each respective current is provided by the second source.

In a seventh example that includes the features of the sixth example, additional instructions are stored that cause the machine to dynamically allocate the first power and the second power between the first ECB and a second ECB of the plurality of ECBs by distribution of current from the plurality of sources, based at least in part on an updated first activity level and a second activity level that is associated with the second ECB. Optionally, additional instructions are stored to cause the machine to throttle operation of at least one of the first ECB and the second ECB when a total requested power exceeds a sum of the first power and the second power, where the total requested power is based on the first activity level and the second activity level, and where the total requested power is a sum of a first requested power of the first ECB and a second requested power of the second ECB.

In an eight example, a system includes power management logic to allocate power provided by a plurality of power sources to each of a plurality of ECBs, where each of the plurality of power sources is to provide a respective portion of the power that is allocated among two or more of the ECBs. The power management logic is further to receive an indication of a corresponding activity level from each of at least one of the plurality of ECBs, and responsive to a change in an activity level of one of the ECBs, to dynamically reallocate the power to the plurality of ECBs. The system also includes memory to store configuration information for each ECB. Optionally, the power management logic is to reallocate the power responsive to satisfaction of an activity change threshold by a first activity level associated with the first ECB.

In a ninth example that includes the features of the eighth example, the power management logic is to dynamically reallocate the power by determination of a corresponding power portion to be provided to each of the ECBs by each of the power sources. The power portions are determined for a defined time period. In an embodiment, power to the ECBs is reallocated by adjustment of corresponding current to be provided to each ECB while a corresponding voltage supplied to each ECB is substantially constant.

In a tenth example, a method includes distributing first power received from a first source to each of a plurality of electronic circuitry blocks (ECBs) of a system on a chip (SOC), and distributing second power received from a second source to each of the plurality of ECBs. The method also includes redistributing the first power and the second power among the plurality of ECBs responsive to a change in a first activity level associated with a first ECB of the plurality of ECBs. Optionally the method includes initiating a change of a magnitude of output voltage of one or more of the sources, responsive to the change in the first activity level exceeding an activity level threshold.

Optionally, redistributing the power comprises changing a magnitude of respective currents provided to two or more of the ECBs, where a first portion of each respective current is provided by the first source and a second portion of each respective current is provided by the second source.

An eleventh example is a method that includes the features of the tenth example and further includes dynamically allocating the first power and the second power between the first ECB and a second ECB of the plurality of ECBs by distribution of current from the plurality of sources, based at least in part on an updated first activity level and a second activity level that is associated with the second ECB. Optionally, the method includes throttling operation of at least one of the first ECB and the second ECB when a total requested power exceeds a sum of the first power and the second power, where the total requested power is based on the first activity level and the second activity level, and wherein the requested power is a sum of a first requested power of the first ECB and a second requested power of the second ECB.

A twelfth example is an apparatus that includes means for distributing first power received from a first source to each of a plurality of electronic circuitry blocks (ECBs) of a system on a chip (SOC), and distributing second power received from a second source to each of the plurality of ECBs, and means for redistributing the first power and the second power among the plurality of ECBs responsive to a change in a first activity level associated with a first ECB of the plurality of ECBs. Optionally, the apparatus includes means for initiating a change of a magnitude of output voltage of one or more of the sources, responsive to the change in the first activity level exceeding an activity level threshold.

A thirteenth example includes the features of the twelfth example, where redistributing the power includes changing a magnitude of respective currents provided to two or more of the ECBs, wherein a first portion of each respective current is provided by the first source and a second portion of each respective current is provided by the second source.

A fourteenth example includes the features of the twelfth example, and further includes means for dynamically allocating the first power and the second power between the first ECB and a second ECB of the plurality of ECBs by distribution of current from the plurality of sources, based at least in part on an updated first activity level and a second activity level that is associated with the second ECB. Optionally included are means for throttling operation of at least one of the first ECB and the second ECB when a total requested power exceeds a sum of the first power and the second power, where the total requested power is based on the first activity level and the second activity level, and where the total requested power is a sum of a first requested power of the first ECB and a second requested power of the second ECB.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of electronic circuitry blocks (ECBs), including a first ECB and a second ECB;
a distribution network comprising a plurality of linear regulators each to receive power from a corresponding voltage regulator and output a voltage;
a plurality of multiplexers to receive the voltage from at least some of the plurality of linear regulators and having an adjustable output current distribution to:
provide, to the first ECB, first ECB power, and provide, to the second ECB, second ECB power, wherein the first ECB power includes a first portion of first power from a first linear regulator and a first portion of second power from a second linear regulator and the second ECB power includes a second portion of the first power and a second portion of the second power; and
power management logic adapted to adjust the first ECB power responsive to a change in a first activity level associated with the first ECB and update a power license level for the first ECB, the power license level stored in a configuration register and to provide an indication of peak power to be provided to the first ECB, wherein the power management logic is to dynamically change the first ECB power by adjustment of the first portion of the first power and adjustment of the first portion of the second power and to initiate a change of a magnitude of an output voltage of one or more of the first linear regulator and the second linear regulator, responsive to the change in the first activity level exceeding an activity change threshold.

2. The processor of claim 1, wherein the distribution network includes a first multiplexer to receive the first power from the first linear regulator and provide the first portion of the first power to the first ECB and the second portion of the first power to the second ECB.

3. The processor of claim 2, wherein the distribution network further includes a second multiplexer to receive the second power from the second linear regulator and provide the first portion of the second power to the first ECB and the second portion of the second power to the second ECB.

4. The processor of claim 1, wherein when the first portion of the first ECB power is to be reduced, the distribution network is to provide additional power to another ECB responsive to a request from the other ECB to increase supplied power to the other ECB.

5. The processor of claim 1, wherein the power management logic is to enable the adjustment of the first ECB power by a change in first current provided to the first ECB while a first voltage to the first ECB is maintained at a substantially constant value.

6. The processor of claim 1, wherein the power management logic includes storage to store corresponding configuration parameters for each ECB, the configuration parameters associated with operating parameters of at least one of the first ECB and the second ECB including operating frequency of the corresponding ECB.

7. The processor of claim 1, wherein the corresponding voltage regulator is to provide a corresponding voltage that has a substantially constant value during each time period in which the first activity level and a second activity level associated with the second ECB are unchanged.

8. The processor of claim 1, wherein the power management logic includes power control logic to receive an indicator of the first activity level from the first ECB, and to determine the first ECB power based at least in part on the first ECB activity level.

9. The processor of claim 1, wherein the power management logic includes power control logic to determine a first voltage to be provided to the first ECB based at least in part on an initial frequency of operation of the first ECB.

10. The processor of claim 1, wherein the power management logic is to periodically poll the first ECB to determine whether the first activity level has changed.

11. The processor of claim 10, wherein the first activity level is to be polled at a period that is less than or equal to approximately 20 microseconds.

12. The processor of claim 1, wherein the first ECB includes at least one of a processor core, a portion of a processor core, a graphics processing unit, a memory, and a controller.

13. A non-transitory machine-readable medium having stored thereon instructions, which if performed by a machine cause the machine to perform a method comprising:
distributing first power received from a first voltage regulator through a first multiplexer having an adjustable output current distribution to a plurality of electronic circuitry blocks (ECBs) of a system on a chip (SOC), and distributing second power received from a second voltage regulator through a second multiplexer having an adjustable output current distribution to the plurality of ECBs;
responsive to a change in a first activity level associated with a first ECB of the plurality of ECBs, updating a power license level for the first ECB, the power license level stored in a configuration register and to provide an indication of peak power to be provided to the first ECB, and redistributing the first power and the second power among the plurality of ECBs; and
initiating a change of a magnitude of an output voltage of one or more of the first and second voltage regulators, responsive to the change in the first activity level exceeding an activity change threshold.

14. The non-transitory machine-readable medium of claim 13, wherein redistribution of the power comprises a change in magnitude of respective currents provided to two or more of the ECBs, wherein a first portion of each respective current is provided by the first voltage regulator and a second portion of each respective current is provided by the second voltage regulator.

15. The non-transitory machine-readable medium of claim 13, further comprising instructions to cause the machine to redistribute the first power and the second power between the first ECB and a second ECB of the plurality of ECBs by redistribution of current from the first voltage regulator and the second voltage regulator, based at least in part on an updated first activity level that is associated with the first ECB.

16. The non-transitory machine-readable medium of claim 15, further including instructions to cause the machine to throttle operation of at least one of the first ECB and the second ECB when a total requested power exceeds a sum of the first power and the second power, wherein the total requested power is based on the first activity level and a second activity level associated with the second ECB.

17. A system comprising:
a processor comprising:
a plurality of cores;
a plurality of linear regulators each to receive power from a corresponding voltage regulator of a power supply and output a voltage;
a plurality of multiplexers to receive the voltage from at least some of the plurality of linear regulators and having an adjustable output current distribution; and
power management logic to:
allocate power provided by a plurality of voltage regulators of the power supply to the plurality of cores, wherein each of the plurality of voltage regulators is to provide a respective portion of the power that is allocated among two or more of the cores;
receive an indication of a corresponding activity level from at least one of the plurality of cores;
responsive to a change in the activity level of the at least one core, dynamically reallocate the power to the plurality of cores and initiate a change of a magnitude of an output voltage of one or more of the plurality of linear regulators;
the power supply coupled to the processor, the power supply including the plurality of voltage regulators; and
memory to store configuration information for each core.

18. The system of claim 17, wherein the power management logic is to dynamically reallocate the power responsive to satisfaction of the activity change threshold by the first activity level associated with a first core of the plurality of cores.

19. The system of claim 18, wherein the power management logic is to dynamically reallocate the power by determination of a corresponding updated power portion to be provided to each core of the plurality of cores by each of the linear regulators, wherein the updated power portions are determined for a defined time period.

* * * * *